(12) United States Patent
Van Curen

(10) Patent No.: US 9,282,722 B2
(45) Date of Patent: Mar. 15, 2016

(54) HAND-HELD TRANSMITTER FOR AN ANIMAL TRAINING SYSTEM

(71) Applicant: Greg Van Curen, Fremont, IN (US)

(72) Inventor: Greg Van Curen, Fremont, IN (US)

( * ) Notice: Subject to any disclaimer, the term of this patent is extended or adjusted under 35 U.S.C. 154(b) by 49 days.

(21) Appl. No.: 14/101,897

(22) Filed: Dec. 10, 2013

(65) Prior Publication Data

US 2015/0156990 A1    Jun. 11, 2015

(51) Int. Cl.
*A01K 15/02* (2006.01)
*A01K 27/00* (2006.01)

(52) U.S. Cl.
CPC .............. *A01K 15/021* (2013.01); *A01K 27/001* (2013.01); *A01K 27/009* (2013.01)

(58) Field of Classification Search
CPC ............................ A01K 27/009; A01K 15/021
USPC .................................................. 119/719, 720
See application file for complete search history.

(56) References Cited

U.S. PATENT DOCUMENTS

| | | | |
|---|---|---|---|
| 6,167,843 B1 * | 1/2001 | Kim .............................. | 119/720 |
| 6,415,742 B1 | 7/2002 | Lee et al. | |
| RE39,931 E * | 12/2007 | So ................................. | 119/719 |
| 2002/0040689 A1 * | 4/2002 | So ................................. | 119/720 |
| 2002/0092478 A1 | 7/2002 | Duncan et al. | |
| 2005/0185509 A1 * | 8/2005 | Carnevale ..................... | 366/601 |
| 2005/0217606 A1 * | 10/2005 | Lee et al. ...................... | 119/720 |
| 2006/0164383 A1 | 7/2006 | Machin et al. | |
| 2009/0205583 A1 * | 8/2009 | So ................................. | 119/719 |
| 2009/0295616 A1 | 12/2009 | Martin | |
| 2012/0260182 A1 * | 10/2012 | Hansen et al. ................ | 715/736 |
| 2013/0239905 A1 * | 9/2013 | Kim et al. ..................... | 119/720 |

OTHER PUBLICATIONS

European Search Report dated May 11, 2015 for European Application No. 14 19 7108 (7 pages).

* cited by examiner

*Primary Examiner* — Monica Williams
(74) *Attorney, Agent, or Firm* — Taylor IP, P.C.

(57) ABSTRACT

An animal training system for controlling the behavior of the animal includes a receiver configured to be worn by the animal, and a hand held transmitter. The hand held transmitter includes a case with an front face, a transmitter circuit within the case for transmitting a wireless signal to the receiver, and an actuator at the front face of the case. The actuator is coupled with the transmitter circuit, and is a non-depressible actuator which is manually movable relative to the case.

17 Claims, 3 Drawing Sheets

HAND-HELD TRANSMITTER FOR AN ANIMAL TRAINING SYSTEM

BACKGROUND OF THE INVENTION

1. Field of the Invention

The present invention relates to animal training systems for controlling the behavior of an animal through the application of a stimulus to the animal, and, more particularly, to hand held transmitters used with such systems.

2. Description of the Related Art

Animal training systems, such as dog training systems, may include a receiver collar which is worn by the dog for applying electrical stimulation to the skin of the dog to control the behavior of the dog. Such dog training system typically also include a portable transmitter which is carried by the trainer. The portable transmitter selectively transmits a radio frequency (RF) signal to the receiver for applying a stimulus when the animal exhibits undesirable behavior. The most common type of stimulation is electrical stimulation, although other types of stimulation pertaining to sound, smell, vibration, water, etc, are also possible. Different levels of electrical stimulation may be applied to the dog by depressing corresponding buttons on the transmitter. Each button is associated with an encoded signal which is transmitted to the receiver. The receiver receives the encoded signal and applies electrical stimulation of a corresponding intensity to the skin of the dog. The intensity may be controlled by changing the voltage level, current frequency and/or pulse width of an applied electrical pulse.

Depending on the particular dog, as well as the type of undesirable behavior displayed by the dog, the stimulation level can vary considerably. For example, some dogs may have a much higher pain tolerance than others, and thus the stimulation level needed to stop the undesired behavior may need to be considerably greater than with other dogs. Moreover, if a dog sees the trainer but simply will not come to the trainer, the amount of stimulation needed may be only at a minimal level, simply to get the dogs attention. On the other hand, if a hunting dog is tracking an undesirable species of game such as deer, the instinct to continue tracking may be strong and thus the amount of stimulation needed may be at a high level.

With older style transmitters, the intensity level was varied by manually inserting a resistor of a particular resistance level into the receiver collar and then depressing the button on the transmitter for activation of the RF signal. With this type of configuration, it is not easy to change the stimulation level applied to the dog. With newer style transmitters, multiple buttons on the transmitter correspond to the different stimulation levels. With this type of configuration, the transmitter must be large enough to accommodate the multiple buttons. If the transmitter is used for multiple dogs, with multiple receivers, the amount of space needed on the transmitter can be a limiting factor. Moreover, such buttons may not be easily operable by persons with a disability of the hands, fingers or arms.

What is needed in the art is a hand held transmitter for an animal training system which allows the stimulation level to be adjusted easily.

SUMMARY OF THE INVENTION

The present invention provides a hand held transmitter with actuators which are movable relative to the transmitter case, such as rollers, knobs, scrollers and/or slides.

The invention in one form is directed to an animal training system for controlling the behavior of the animal. The animal training system includes a receiver configured to be worn by the animal, and a hand held transmitter. The hand held transmitter includes a case with a front face, a transmitter circuit within the case for transmitting a wireless signal to the receiver, and an actuator at the front face of the case. The actuator is coupled with the transmitter circuit, and is a non-depressible actuator which is manually movable relative to the case.

The invention in another form is directed to a hand held transmitter for an animal training system for controlling the behavior of the animal. The hand held transmitter includes a case having a front face, a transmitter circuit within the case for transmitting a wireless signal, and an actuator at the front face of the case. The actuator is coupled with the transmitter circuit, and is a non-depressible actuator which is manually movable relative to the case.

An advantage of the present invention is that the hand held transmitter can be operated without depressing a button.

Another advantage is that the hand held transmitter can be operated by persons with a disability of the fingers, hands and/or arms.

Yet another advantage is that the stimulation level can be easily increased, decreased or stopped.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
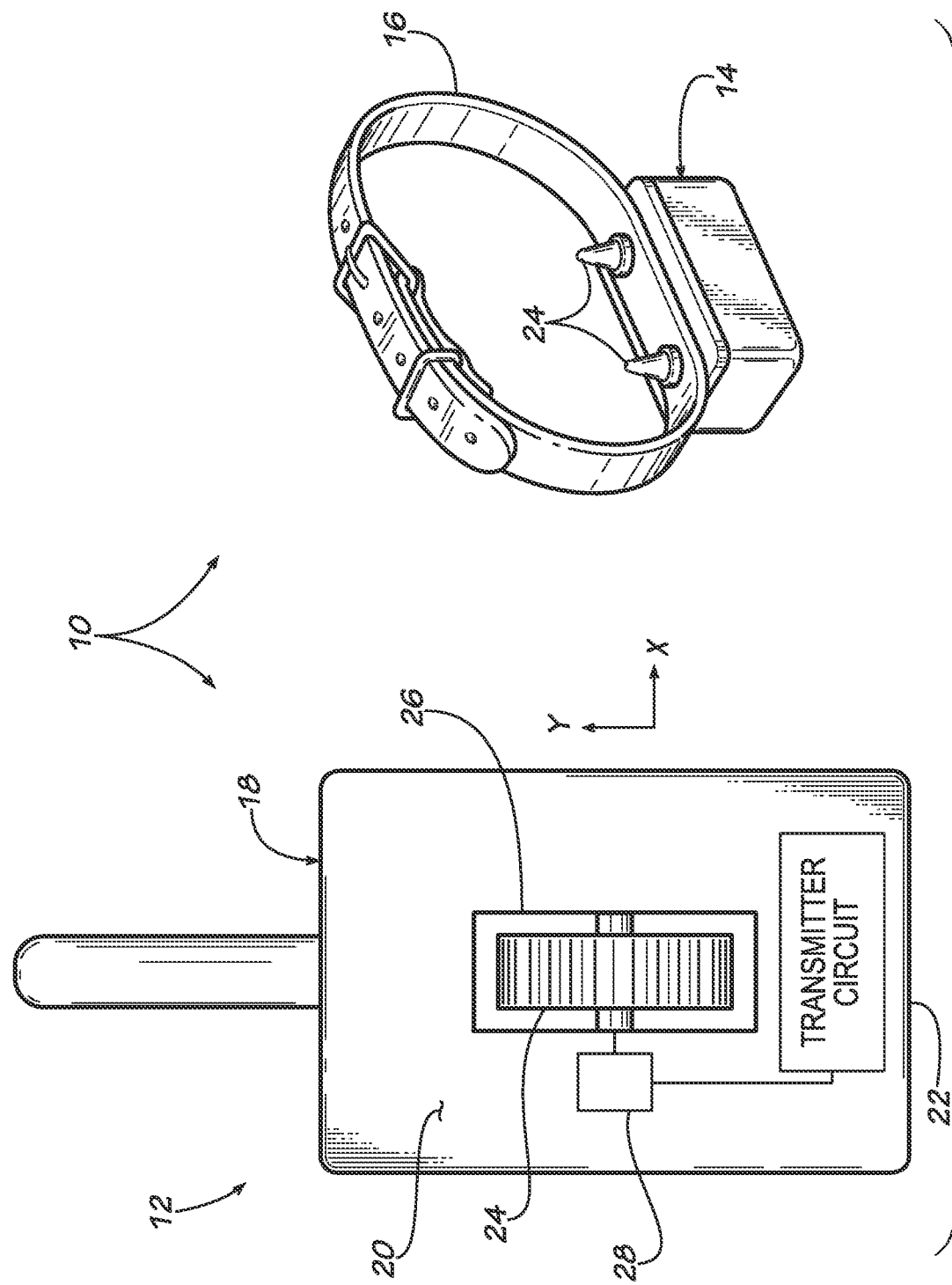
FIG. 1 illustrates an embodiment of an animal training system of the present invention, including an embodiment of a hand held transmitter of the present invention.
Figure 2:
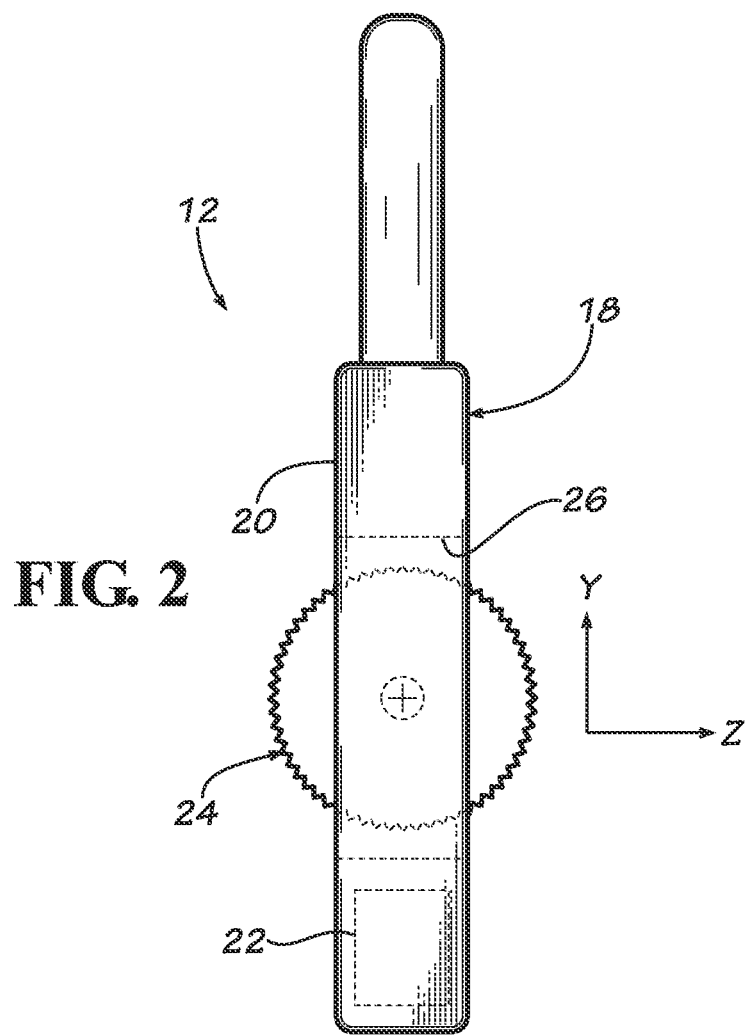
FIG. 2 is a side view of the hand held transmitter shown in FIG. 1.

Referring now to the drawings, and more particularly to FIGS. 1 and 2, there is shown an animal training system 10 which generally includes a hand held transmitter 12 and receiver 14. Animal training system 10 can be used on different species of animals, but is particularly suited for use on dogs.

Receiver 14 is mounted to a collar 16 which may be fastened around the neck of a dog. Receiver 14 may include electrical components of conventional design, such as a receiver circuit or transceiver circuit. The electrical circuitry within receiver 14 is connected with a pair of electrodes or probes 24 which contact the skin of the dog for application of an electrical stimulation at a desired stimulation intensity.

Hand held transmitter 12 includes a case 18 with a front face 20 which faces a user during operation. Handheld transmitter 12 may likewise include electrical components of conventional design therein, such as a transmitter circuit 22 or transceiver circuit (not shown). Transmitter circuit 22 is configured to transmit a wireless signal to a receiver 14, such as an RF signal.

According to an aspect of the present invention, handheld transmitter 12 includes an actuator 24 at the front face 20 thereof which is not in the form of a conventional pushbutton or other type of depressible button. Such buttons are not easily usable by persons with a disability of the fingers, hand and/or arms. Broadly speaking, actuator 24 is easily movable relative to case 18 in a direction which is other than perpendicular (i.e, laterally inward) to front face 20. The actuator 24 is coupled with an encoder 28 which provides an output signal to transmitter circuit 22 corresponding to a stimulation level which is to be applied to the animal, and transmitter circuit 22 transmits an encoded wireless signal to the receiver 14.

More particularly, in the embodiment illustrated in FIGS. 1 and 2, case 18 includes a rectangular shaped opening 26, and actuator 24 is in the form of a rotatable dial which is positioned within the opening 26. For purposes of description, a three-dimensional axis layout is assumed to be as shown in FIGS. 1 and 2, with the Z axis lying along a vector which is perpendicular to the front face 20 which faces the user. With a normal transmitter having pushbuttons on the front face 20, the buttons are depressed by a user in a direction corresponding to the Z axis. In contrast, the rotatable dial 24 shown in FIGS. 1 and 2 is rotated about an axis of rotation which is parallel to the X axis and the front face 20.

Although the handheld transmitter 12 is shown with a rectangular opening 26 formed generally in the center of case 18, the particular location and shape of the opening 26 can vary, depending upon the application and/or the type of specific actuator 24 which is to be positioned therein. For example, the opening 26 could be a square shaped opening, etc. Moreover, the actuator 24 could be in the form of a knob, a scroller, a slide, etc.

As shown in FIG. 2, the dial actuator 24 may extend past both the front face and the back face of the case 18. It is thus necessary to provide one or more safeguards against accidental stimulation of the dog. As one possible safeguard, the transmitter 12 can simply be placed within a holster or the like to prevent accidental rotation of the dial actuator 24. As another option, software can be used to determine if the dial 24 rotates a predetermined angular threshold amount prior to beginning the stimulation. Stimulation is always assumed to start from a preset level corresponding to a first perception by the animal so that over stimulation is very unlikely. Furthermore, it is possible to stiffen up the dial turning pressure to add another layer of protection from accidental activation.

With conventional animal training systems, the first stimulation which is applied to the dog corresponds to the selected stimulation level. With the present invention, the first stimulation level corresponds to a very slight stimulation associated with the perception level of the dog. The dogs are thus never surprised by the electrical stimulation because it always ramps up from the perception level so that the dog has the option to obey at any time. It is also possible to provide a Pavlovian tone or vibration for a predetermined angular rotation of the dial 24 (e.g., 15°) and then begin the electrical stimulation at the perception level for continued rotation of the dial 24.

Figure 3:
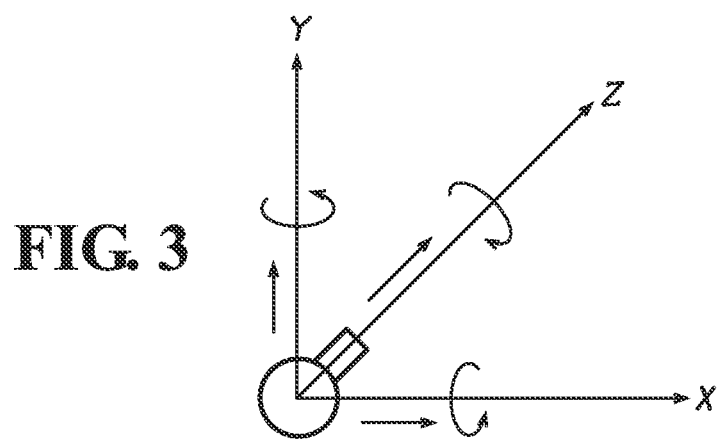
FIG. 3 is a schematic illustration of different possible directions of movement of the manual actuator used with the hand held transmitter of the present invention.

FIG. 3 illustrates the differences between a normal pushbutton activation on a transmitter, and activation of the actuator 24 with the present invention. With a conventional transmitter, the pushbutton (whether extending from the front face of the case or flush with the case) always is in the Z direction away from the front face 20 of the case 18. This type of activation by the user can be difficult for some users, particularly those with physical disabilities. As described above, a dial which extends from the front face 20 can rotate about the X axis. Alternatively, a dial can be positioned to rotate about the Y axis, the Z axis or some other angular orientation therebetween. Moreover, rather than having to depress a button into the case along the Z axis, the actuator 24 can simply be moved, slid, etc. along the front face of the case 18 which corresponds to a plane lying in the X-Y plane. The actuator 24 is always readily accessible to the user and is easily operated by the user, regardless of any physical disabilities.

To operate the handheld transmitter 12 shown in FIGS. 1 and 2, a user simply rotates the dial actuator 24 (presumably clockwise in the view of FIG. 2). As the user continues to rotate the dial actuator 24, the electrical stimulation applied to the dog continues to rise. Electrical stimulation can be turned off by simply stopping or reversing the dial actuator 24. Alternatively, the electrical stimulation can be reduced by reversing the direction of rotation of the dial actuator 24. When the electrical stimulation is stopped, the stimulation level is reset automatically to the perception level of the dog so that the next actuation of the dial actuator 24 again begins at the lowest intensity level.

Figure 4:
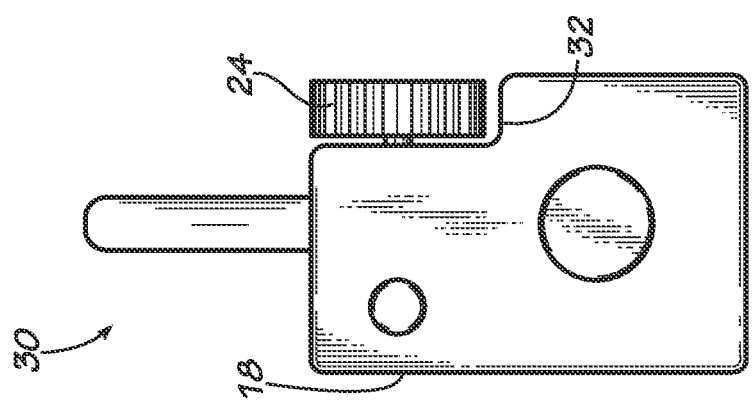

Referring now to FIG. 4, another embodiment of a handheld transmitter 30 is illustrated which includes a dial actuator 24 which is positioned within a notch 32 of case 18. The dial actuator 24 thus also rotates about an axis of rotation which is parallel to the X axis and the front face or front face 20, similar to the embodiment shown in FIGS. 1 and 2.

Figure 5:
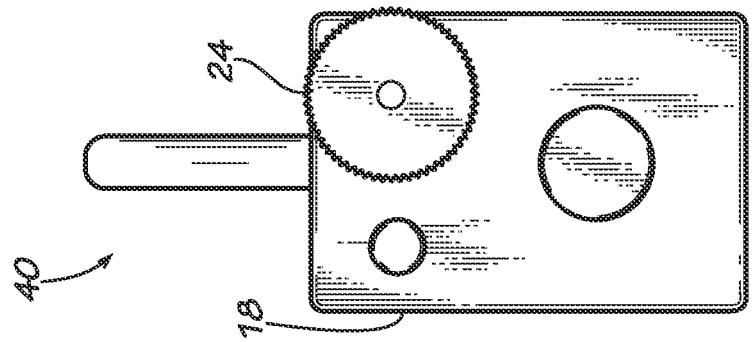

In the embodiment illustrated in FIG. 5, the hand held transmitter 40 includes a dial actuator 24 which extends toward the user from the front face 20. The dial actuator 24 thus rotates about an axis (Z axis) that is perpendicular to the front face 20. The circumference of the dial actuator 24 also extends past the outer periphery of the case 18 so that it can be easily operated by a handicapped user.

Figure 6:
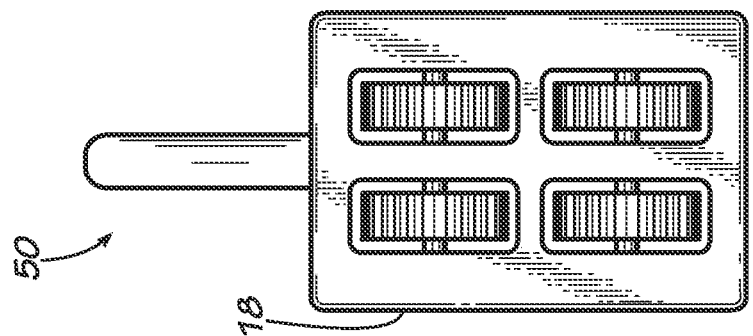

Referring now to FIG. 6, there is shown yet another embodiment of a handheld transmitter 50 which includes multiple dial actuators 24 corresponding to multiple dogs which are to be controlled during a training scenario. The hand held transmitter 50 can include the same or different types of actuators.

Figure 7:
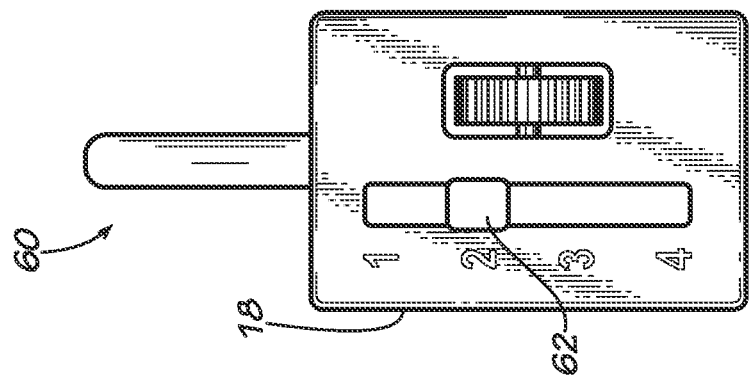
FIGS. 4-7 illustrate other embodiments of the hand held transmitter of the present invention.

Referring now to FIG. 7, a handheld transmitter 60 includes a slide actuator 62 which may be manually slid up or down on the front face 20 of case 18. The slide actuator 62 can optionally be biased to the off position so that the electrical stimulation is automatically turned off when a user no longer contacts the slide actuator 62.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An animal training system for controlling the behavior of the animal, said animal training system comprising:
    a receiver configured to be worn by the animal;
    a hand held transmitter including a case, a transmitter circuit within the case for transmitting a wireless signal to said receiver, and an actuator coupled with said transmitter circuit, said actuator being a non-depressible actuator which is manually movable relative to said case, said actuator operable to both cause said hand held transmitter to initiate a signal to said receiver to begin to apply a stimulus to said animal, and to continually control its intensity in direct relation to said movement of said non-depressible actuator relative to said case; and said actuator being a rotatable dial and being further situated so that a portion of its radius extends past at least one of a front face, a side face, and a top face.

2. The animal training system of claim 1, wherein:
a second actuator comprises a knob, a dial, a scroller or a slide.

3. The animal training system of claim 1, wherein said actuator is rotatable about an axis which is perpendicular or parallel to the front face of the case.

4. The animal training system of claim 3, wherein said case has an opening, and said axis of said actuator is located within said opening.

5. The animal training system of claim 3, wherein said case has a notch, and said axis of said actuator is located within said notch.

6. The animal training system of claim 1, wherein said actuator comprises one of a plurality of actuators.

7. The animal training system of claim 1, wherein said receiver is a collar-mounted receiver.

8. The animal training system of claim 1, wherein:
said actuator being biased to an off position so that said stimulus is automatically turned off when a user no longer contacts said actuator.

9. The animal training system of claim 1, wherein:
said intensity of said stimulus being reset automatically to a perception level of said animal so that the next actuation of said actuator beginning again at the lowest said intensity of said stimulus.

10. A hand held transmitter and a receiver for an animal training system for controlling the behavior of the animal, said system comprising:
the hand-held transmitter having a case;
a transmitter circuit within the case for transmitting a wireless signal;
an actuator coupled with said transmitter circuit, said actuator being a non-depressible actuator which is manually movable relative to said case, said actuator operable to both cause said hand held transmitter to initiate a signal to said receiver to begin to apply a stimulus to said animal, and to continually control its intensity in direct relation to said movement of said non-depressible actuator relative to said case; and
said actuator being a rotatable dial and being further situated so that a portion of its radius extends past at least one of a front face, a side face, and a top face; and
the receiver being a collar-mounted receiver.

11. The hand held transmitter and receiver of claim 10, wherein: a second actuator comprises a knob, a dial, a scroller or a slide.

12. The hand held transmitter and receiver of claim 10, wherein said actuator is rotatable about an axis which is perpendicular or parallel to the front face of the case.

13. The hand held transmitter and receiver of claim 12, wherein said case has an opening, and said axis of said actuator is located within said opening.

14. The hand held transmitter and receiver of claim 12, wherein said case has a notch, and said axis of said actuator is located within said notch.

15. The hand held transmitter and receiver of claim 10, wherein said actuator comprises one of a plurality of actuators.

16. The hand held transmitter and receiver of claim 10, wherein: said actuator being biased to an off position so that said stimulus is automatically turned off when a user no longer contacts said actuator.

17. The hand held transmitter and receiver of claim 10, wherein: said intensity of said stimulus being reset automatically to a perception level of said animal so that the next actuation of said actuator beginning again at the lowest said intensity of said stimulus.

* * * * *